United States Patent Office 3,125,518
Patented Mar. 17, 1964

3,125,518
TREATING OF WELLS
John A. Knox, Aleck B. Featherston, and Reginald M. Lasater, Duncan, Okla., assignors to Halliburton Company, Duncan, Okla., a corporation of Delaware
No Drawing. Filed Sept. 15, 1960, Ser. No. 56,113
7 Claims. (Cl. 252—8.55)

This invention relates generally to treating operations performed in oil and gas wells or the like and, more particularly, to well treating compositions and to methods of preparing and utilizing the same in wells, such as in hydraulic fracturing operations.

It is anticipated that the invention will be most widely applied in connection with hydraulic fracturing operations wherein it is desired to render the surfaces of substances or structures preferentially wettable by certain types of fluids. Thus, where propping agents in the form of particles of sand or like hard substances are introduced into the well with the fracturing fluid, the invention may be applied where it is desired to control the wettability of the propping agents. It is understood, however, that the invention may also find wide application elsewhere.

Prior hereto, in fracturing operations of the type performed using oil and sand to fracture an oil-bearing zone or formation wherein water is also present and produced with the oil, the practice has developed of employing water-wet sand particles as the propping agents. This is due to the belief that where both oil and water are present in appreciable quantities, the oil will flow more readily out of the well if the surfaces of the rock and sand substances past which it is conducted are water-wet rather than oil-wet.

One way of water-wetting the sand is to treat it with a water-wetting surfactant prior to blending the sand with the oil. Another way is to mix the oil, water and water-wetting surfactant together and then blend these fluids with the relatively dry sand.

On the other hand, there are instances where the use of water-wet propping agents may not prove advantageous.

The use of oil-wet sand particles may be preferred, for example, where the zone or formation to be fractured does not contain water in appreciable quantities. In this instance, the preference for oil-wet sand particles rather than water-wet sand particles is due to the belief that where oil is the only fluid present it will flow more readily through oil-wet capillaries than through water-wet capillaries.

In this connection, it will be appreciated by those skilled in the art that it is not always possible to know with certainty whether or not the oil-bearing zone or formation in a well is relatively water-free. Especially where a fracturing operation is to be performed, it is almost impossible to predict that an oil-bearing zone or formation which was considered substantially water-free prior to the treatment will remain so after being subjected to the forces and stimulation resulting during the course of performing the fracturing operation.

The present invention may be applied to particular advantage in fracturing operations wherein it is desired to employ a fracturing fluid containing initially oil-wet particles of sand or other hard substances as the propping agents and wherein it is desired that the propping agents become water-wet upon contacting water, such as after being introduced into the well, but remain oil-wet in the event that water is not encountered.

When the fracturing fluid is an aqueous or water-base fluid, the use of oil-wet sand or the like may provide additional advantages. For one thing, the handling and pumping of the fluid after mixture thereof may be facilitated. This is because oil-wet particles are ordinarily more readily suspended in aqueous or water-base carrying fluids, due to the oil-wet sand grain carrying a film of oil which in effect reduces the density of the total dispersed particle, as compared with the density of a dispersed grain of water-wet sand. Since sand appears to be preferentially water-wet, unless treated, the inclusion of a treating agent is needed to render the sand oil-wet.

Also, it is believed that oil-wet sand particles are more easily injected with the fracturing fluid into the treated zone or formation, such as when additional pressure is applied after the zone or formation is fractured. Furthermore, it is believed that oil-wet sand particles will tend to remain in place in the fractured zone or formation, especially during the "flow-back" period when the aqueous fracturing fluid is removed. This is because the oil-wet particles tend to clump together and thereby more effectively resist the forces tending to dislodge the particles from their positions in spacing or propping relation to the opposing surfaces of the well strata adjacent thereto.

One object of the present invention is to provide an improved fracturing fluid for use in wells, the fluid containing initially oil-wet propping agents which remain oil-wet if water is not encountered in the well.

Another object of the invention is to provide improved treating compositions and methods useful in rendering particles of sand or the like oil-wet.

Another object of the invention is to provide improved compositions and methods useful in preparing treating or fracturing fluids for use in wells.

Another object of the invention is to provide an improved treating composition and an improved well treating method utilizing the same.

Another object of the invention is to provide an improved fracturing fluid and an improved hydraulic fracturing method utilizing the same in wells, the fluid and method being suited for use in fracturing zones or formations containing either water-free oil or both oil and water.

A further object of the invention is to provide an improved treating or fracturing fluid and method of the type described wherein a wetting agent is employed which is selective in that surfaces are rendered preferentially water-wet only if water is present.

The foregoing and additional objects and advantages are attained by the invention which, in one aspect thereof, involves the concept of preparing and utilizing a well treating or fracturing fluid containing a dormant, slow-acting or indirect water-wetting agent. This agent is preferably not soluble in oil but is soluble, preferably at a very slow rate, in any water which is present or otherwise comes in contact therewith, such as due to being produced with the oil from an oil-bearing zone or formation which is treated or fractured using the fluid containing the dormant, slow-acting or indirect water-wetting agent. As the agent dissolves in the water, surfaces of sand and like hard substances in the well, such as propping agents introduced thereinto with the treating or fracturing fluid, are in effect treated, in situ, so as to become preferentially water-wet.

In a related aspect, the invention involves the other or further concept of oil-wetting particulated solids, such as particles of sand or other hard substances used as propping agents or the like in well treating or fracturing operations. For example, the propping agents included in the aforesaid treating or fracturing fluid may be treated to render the surfaces thereof oil-wet. Where this is done initially, such as prior to or during the introduction of the treating or fracturing fluid into the well, the oil-wet propping agents will subsequently either remain oil-wet or become preferentially water-wet, depending on whether or not sufficient water is present or encountered to activate the dormant, slow-acting or indirect water-wetting agent introduced into the well with the initially oil-wet propping agents.

In one way of proceeding, a water-wetting agent in the form of a complex phosphate material is included in a fracturing fluid containing particles of sand or other hard substances suited for use as spacing or propping agents. The propping agents are preferably treated to render the surfaces thereof initially oil-wet, as will appear more fully hereinafter. Along with the fracturing fluid, the phosphate material and the propping agents are pumped or otherwise introduced into the well and thence under pressure into contact with and through openings in the fractured zone or formation of the well.

The complex phosphate material may be a phosphate glass, such as sodium phosphate glass, which is slowly soluble in water. A preferred material is a bimetallic phosphate such as sodium calcium polyphosphate, which is relatively very slowly soluble, but other polyphosphates with slow rates of dissolution in water may be employed to particular advantage in certain applications. Where higher temperatures (for example, above about 180° Fahrenheit) are likely to be encountered, the trimetallic phosphates, such as sodium magnesium calcium glassy phosphate, may be used to advantage.

While the invention is not limited to any particular theory of behavior, it is believed that the phosphate material, if no water is present or encountered in the well, remains undissolved in the fracturing fluid and, thus, the oil-wet spacing or propping agents remain oil-wet after entering the fractured zone or formation.

On the other hand, if water is available, it is believed that the phosphate material becomes dissolved therein and the ions of the resulting solution react with substances in or become adsorbed on accessible rock or sand substances, such as on surfaces of the spacing or propping agents introduced with the fracturing fluid into the well and on surfaces of the rock or sand strata of the well itself. Where these surfaces have previously been rendered oil-wet, such as by treating the sand particles prior to or during the course of preparing the fracturing fluid, the ions of the phosphate material in water solution displace or override the oil-wetting treating agent and function to render the surfaces preferentially water-wet. Since the phosphate material is preferably only slowly soluble in the water, the treatment of the surfaces to render them preferentially water-wet is continuously renewed during the period while the phosphate material is being continuously dissolved. This dissolution may occur to some extent in the water, if any, contained in the fracturing fluid. Subsequently, the phosphate material may dissolve in the water, if any, produced with the oil from the treated zone or formation.

With regard to the length of the period of dissolution, it is pointed out that oil wells which produce relatively large amounts of water with the oil will naturally need less treatment to assure that the sand spacing and propping agents remain preferentially water-wet. While the phosphate material will become dissolved more quickly in wells producing considerable water, this will only facilitate or hasten the completion of the treatment of the initially oil-wet sand particles in these wells to render them preferentially water-wet. Where less water is available, a given amount of the phosphate material will ordinarily require a longer period of time to dissolve, but even so there should be sufficient ions in solution to adequately treat the well. As a result, there will be continuous treatment for a longer period of time in those wells where there is greatest need for it.

While the particle sizes of the phosphate material are not believed critical, it is believed that maximum benefits will be obtained where the particle sizes are large enough so that the relatively slow rate of dissolution of the material, considering the prevailing conditions of temperature and other factors, is not unduly increased as a result of the material being used in particulated form. Of course, considering the manner of application of the treatment, as well as the particular conditions encountered in the well being treated, it will ordinarily be desirable or necessary to employ particle sizes which are convenient to handle and place at the point of treatment. For most wells, it is believed that satisfactory results will be obtained using particles ranging in size from those capable of passing a standard 200 mesh sieve up to as large as may be conveniently handled, using the equipment available at the well, with preference being given to those particles which are not so large as to be impossible or difficult to inject with the spacing and propping agents into the fractured zone or formation of the well. Particles ranging in size from 10 to 40 mesh will, it is believed, find wide usage.

The amount of phosphate material needed to treat a particular well will, of course, depend upon several factors. In general, it is believed that more than about 500 to 1,000 pounds of the phosphate material will not be needed per treatment. It it believed that the general practice will be to include from about 200 to about 500 pounds of the phosphate material per treatment and from about 100 to about 10,000 pounds of oil-wet sand per 1,000 gallons of the fracturing fluid. The phosphate material may be distributed throughout only a part or all of the fracturing fluid introduced into the well.

As previously indicated, the wetting of the sand particles with oil is particularly advantageous where the fracturing fluid itself is aqueous, since the lighter oily sand particles are particularly easy to disperse and carry in suspension. However, the use of a water-base fracturing fluid will result in the phosphate material having a tendency to become dissolved during the course of performing the fracturing operation. If the rate of dissolution is too rapid, it is possible that the initially oil-wet sand particles could become water-wet due to the water in the fracturing fluid. To avoid or reduce this tendency, it is recommended that the phosphate material be only very slowly soluble in water, especially where it is used in a water-base fracturing fluid.

In order to assure that the propping agents will be oil-wet initially, it is proposed to treat the particles of sand or the like with an agent capable of altering the surface conditions of the particles to render the same preferentially oil-wet.

The inclusion of a suitable oil-wetting surfactant, and oil, will result in the sand particles being oil-wet at the time when the same are introduced into the well, even though the fracturing fluid carrying the particles also contains the water-wetting agent of the present invention. This is because the phosphate material prior to dissolving in water does not function to alter the surface conditions of the sand particles.

If desired, the particles of sand or the like may be treated to render surfaces thereof oil-wet prior to the particles being added to the carrying fluid. Alternatively, the particles of sand or the like may be added in their natural or relatively dry condition to the carrying fluid and an oil-wetting surfactant may be included in or added to the fluid so that the treatment of the particles to render the same oil-wet occurs after the various ingredients have been combined.

In treating the sand particles, a solution of an oil-wetting surfactant in oil may be desired, such as where the carrying fluid to be used is a non-aqueous or oil-base fluid. Alternatively, the sand particles may be treated with a solution of an oil-wetting surfactant in water, such as where the carrying fluid to be used is an aqueous or water-base fluid.

Typical examples of suitable oil-wetting agents which are oil-soluble are the primary, secondary and tertiary amines, such as the mono-, di and tri-coco amines; the diamines, such as N-tallow-1, 3 propylene diamine; the oil-soluble fatty acids; and salts of the foregoing amines and diamines formed by reacting the same with long chain fatty acids.

Typical examples of suitable oil-wetting agents which are water-soluble are the quaternary ammonium salts, such as oleyl trimethyl ammonium chloride, and salts of the above amines and the diamines formed by reacting the same with short chain fatty acids, such as acetic acid.

It is anticipated that the usage of oil-wet propping agents will generally be preferred, even in many instances where the carrying fluid is a non-aqueous or oil-base fluid, and especially so if the oil-bearing zone or formation to be treated is believed to be substantially water-free.

However, it is understood that where the carrying fluid is a non-aqueous or oil-base fluid, the sand particles may be found to be more readily suspended if used in their natural or preferentially water-wet condition. This is because a water-wet sand particle, when dispersed in oil, will in effect have less density than will an oil-wet sand particle, due to including a film of water which is a material less dense than is the material of the sand grain itself.

Even in this latter instance, however, the inclusion of a dormant, slow acting or indirect water-wetting agent in accordance with the invention may prove very advantageous, such as to assure that the sand particles do not become oil-wet due to the activity of unknown or otherwise unexpected surfactants which might be present, such as in the crude or native petroleum fluid or in treating or other fluids introduced into the well at some other time.

In carrying out a fracturing and treating operation, using the method of the present invention, the propping agents, such as the relatively dry or oil-wet sand particles (as the case may be), and the phosphate material may conveniently be first added together or combined. Then, the resulting mixture may be added to the fracturing fluid at the well site using conventional equipment, such as a mechanical stirring and proportioning device. Where other ingredients are to be included, these may be added at any convenient times in accordance with standard procedures.

Among the other ingredients which may be included are surface active agents selected to prevent, reduce or break emulsions and water blocks. Care should be used, in selecting these agents, to avoid those which would be incompatible with the other ingredients, especially the oil-wetting agent.

The introduction of the fracturing fluid and additives into the well may be accomplished using standard pumping equipment and procedures. If desired, well packers may be employed at one or both locations in the well above and below the zone or formation to be fractured. In any event, the fluid carrying the additive particles is pumped or otherwise introduced into the well and thence is caused or allowed to contact a section of the underground strata. Then pressure is applied to the fluid, as by pumping, which causes pressure to be built up in the well against the strata section in contact with the fluid. The application of pressure is continued until the strata section is fractured, whereupon fluid carrying the additive particles is injected through openings extending into the strata section.

Since the particles of oil-insoluble phosphate material are carried with the oil-wet sand particles into crevices and openings present or created in the fractured zone or formation, at least some of the phosphate particles become disposed between the opposing surfaces of the openings and to some extent function, as do the sand particles, as spacing or propping agents to aid in holding these surfaces apart even after the fracturing operation has been completed. However, if water is present or encountered, the phosphate material commences to dissolve. As previously indicated, it is believed that the ions of the dissolved phosphate material continue to function as a treating agent until after complete dissolution of the material and removal thereof from the well. This treating agent renders surfaces of rock and sand substances preferentially water-wet, thereby facilitating the production of oil from the treated zone or formation.

While the invention has been described herein with particular reference to certain details and embodiments thereof, it is understood that these are by way of example, and not by way of limitation, the scope of the invention being best defined in the appended claims.

What is claimed is:

1. In a method of fracturing an underground zone or formation in oil and gas wells, the step of, introducing into the well an aqueous fracturing fluid containing a quantity of dispersed hard particles suitable for use as propping agents, said particles having been treated to be preferentially oil-wet and retaining said characteristic until at least reaching the formation to be fractured, and a quantity of a particulated polyphosphate compound which is slowly soluble in water for rendering said particles preferentially water-wet after said particles have been placed in the formation and thereby providing a continuous treatment of said particles when contacted with water to cause said particles to remain preferentially water-wet over a prolonged period of time.

2. In a method of fracturing an underground zone or formation in oil and gas wells, the step of, introducing into the well an aqueous fracturing fluid containing a quantity of dispersed hard particles suitable for use as propping agents, said particles having been treated to be preferentially oil-wet, and a quantity of an agent slowly soluble in water for rendering said particles preferentially water wet after said particles have been placed in the formation, said agent being selected from the group consisting of alkali metal polyphosphates, alkali metal alkaline earth metal polyphosphates, and alkali metal calcium magnesium polyphosphates.

3. The method of claim 2, wherein said agent is sodium phosphate glass.

4. The method of claim 2, wherein said agent is sodium calcium polyphosphate.

5. The method of claim 2, wherein said agent is sodium magnesium calcium polyphosphate.

6. A method of treating and fracturing an earthen formation in oil and gas wells, comprising the steps of:
   (a) mixing together a quantity of particulated solids suitable for use as propping agents, said solids having been previously treated to be preferentially oil-wet, and a quantity of a phosphate material slowly soluble in water for rendering said particulated solids and the earthen formation preferentially water-wet after said particulated solids have been placed in the formation, said phosphate material being selected from the group consisting of alkali metal polyphosphates, alkali metal alkaline earth metal polyphosphates, and alkali metal calcium magnesium polyphosphates;
   (b) adding the mixture of the previous step to an aqueous carrying fluid and dispersing said mixture therein, said phosphate material being sufficiently slowly soluble in said carrying fluid whereby said particulated solids remain preferentially oil-wet prior to their being placed in the formation;
   (c) introducing the carrying fluid and mixture dispersed therein into the well;
   (d) applying pressure to the fluid in the well thereby causing the fluid to contact the earthen formation, to fracture said formation, and to be injected into openings extending into the formation whereby said particulated solids and said phosphate material are deposited therein; and,
   (e) said phosphate material slowly dissolved by contact with water in the well whereby the surfaces of the well formation and the particulated solids are continually treated in situ to be preferentially water-wet.

7. A method of treating and fracturing an earthen formation in oil and gas wells, comprising the steps of:
(a) mixing together a quantity of particulated solids suitable for use as propping agents and a quantity of a phosphate material slowly soluble in water for rendering said particulated solids and the earthen formation preferentially water-wet after said particulated solids have been placed in the formation, said phosphate material being selected from the group consisting of alkali metal polyphosphates, alkali metal alkaline earth metal polyphosphates, and alkali metal calcium magnesium polyhposphates;
(b) dispersing said particulated solids and said phosphate materials into an aqueous carrying fluid said phosphate material being sufficiently slowly soluble in said carrying fluid as to have no wetting effect on said particulated solids prior to said solids having been placed in the formation;
(c) adding a quantity of an oil-wetting surfactant to said carrying fluid for rendering the surfaces of said particulated solids preferentially oil-wet;
(d) introducing the carrying fluid and mixture dispersed therein into the well;
(e) applying pressure to the fluid in the well thereby causing the fluid to contact the earthen formation, to fracture said formation, and to be injected into openings extending into the formation whereby said particulated solids and said phosphate materials are deposited therein; and,
(f) said phosphate material slowly dissolved by contact with water in the well whereby the surfaces of the well formation and the particulated solids are continually treated in situ to be preferentially water-wet.

References Cited in the file of this patent
UNITED STATES PATENTS

| | | |
|---|---|---|
| 2,365,489 | Partridge | Dec. 19, 1944 |
| 2,596,844 | Clark | May 13, 1952 |
| 2,779,735 | Brown et al. | Jan. 29, 1957 |
| 2,802,531 | Cardwell et al. | Aug. 13, 1957 |
| 2,860,103 | Buchanan et al. | Nov. 11, 1958 |
| 2,946,746 | Keller | July 26, 1960 |
| 2,960,465 | Ten Brink | Nov. 15, 1960 |
| 3,021,901 | Earlougher | Feb. 20, 1962 |
| 3,044,959 | Martin | July 17, 1962 |